(12) United States Patent
Chen et al.

(10) Patent No.: US 10,476,754 B2
(45) Date of Patent: Nov. 12, 2019

(54) BEHAVIOR-BASED COMMUNITY DETECTION IN ENTERPRISE INFORMATION NETWORKS

(71) Applicant: NEC Laboratories America, Inc., Princeton, NJ (US)

(72) Inventors: Zhengzhang Chen, Princeton Junction, NJ (US); LuAn Tang, Pennington, NJ (US); Zhichun Li, Princeton, NJ (US); Cheng Cao, Bellevue, WA (US)

(73) Assignee: NEC Corporation (JP)

( * ) Notice: Subject to any disclaimer, the term of this patent is extended or adjusted under 35 U.S.C. 154(b) by 22 days.

(21) Appl. No.: 15/902,432

(22) Filed: Feb. 22, 2018

(65) Prior Publication Data

US 2018/0183681 A1 Jun. 28, 2018

Related U.S. Application Data

(63) Continuation-in-part of application No. 15/098,861, filed on Apr. 14, 2016.

(60) Provisional application No. 62/463,976, filed on Feb. 27, 2017, provisional application No. 62/148,232, filed on Apr. 16, 2015.

(51) Int. Cl.
*H04L 12/24* (2006.01)
*H04L 29/06* (2006.01)
*G06F 21/55* (2013.01)
*H04L 12/26* (2006.01)

(52) U.S. Cl.
CPC .......... *H04L 41/145* (2013.01); *G06F 21/554* (2013.01); *H04L 41/142* (2013.01); *H04L 63/1416* (2013.01); *H04L 63/1441* (2013.01); *H04L 43/08* (2013.01)

(58) Field of Classification Search
CPC . H04L 41/145; H04L 41/142; H04L 63/1441; H04L 63/1416; H04L 41/046; H04L 43/08; G06F 21/554
See application file for complete search history.

(56) References Cited

U.S. PATENT DOCUMENTS

| | | | |
|---|---|---|---|
| 8,959,633 B1 * | 2/2015 | Dokey | G06F 21/50 705/30 |
| 8,973,133 B1 * | 3/2015 | Cooley | G06F 21/50 726/22 |
| 9,292,695 B1 * | 3/2016 | Bassett | G06F 21/577 |
| 9,355,007 B1 * | 5/2016 | Eicher | G06F 11/3428 |
| 10,178,120 B1 * | 1/2019 | Keegan | H04L 63/1433 |

(Continued)

OTHER PUBLICATIONS

Marco Caselli et al., Sequence-aware Intrusion Detection in Industrial Control Systems, CPSS'15, Apr. 14, 2015, Singapore.

(Continued)

*Primary Examiner* — Darren B Schwartz
(74) *Attorney, Agent, or Firm* — Joseph Kolodka

(57) ABSTRACT

Methods and systems for detecting host community include modeling a target host's behavior based on historical events recorded at the target host. One or more original peer hosts having behavior similar to the target host's behavior are found by determining a distance in a latent space that embeds the historical events between events of the target host and events of the one or more original peer hosts. A security management action is performed based on behavior of the target host and the determined one or more original peer hosts.

14 Claims, 6 Drawing Sheets

(56) References Cited

U.S. PATENT DOCUMENTS

| | | | | |
|---|---|---|---|---|
| 2006/0095963 | A1* | 5/2006 | Crosby | G06F 21/552 726/22 |
| 2006/0161592 | A1* | 7/2006 | Ertoz | G06F 21/552 |
| 2012/0016633 | A1* | 1/2012 | Wittenstein | G06F 21/552 702/180 |
| 2013/0298242 | A1* | 11/2013 | Kumar | G06F 21/52 726/25 |
| 2014/0215618 | A1 | 7/2014 | Striem Amit | |
| 2015/0135315 | A1* | 5/2015 | Ahmed | G06F 21/552 726/23 |
| 2015/0249685 | A1* | 9/2015 | Crane | H04L 63/20 726/1 |
| 2016/0072815 | A1* | 3/2016 | Rieke | H04L 63/1433 726/3 |
| 2016/0078365 | A1* | 3/2016 | Baumard | G06F 21/552 706/12 |
| 2016/0205122 | A1* | 7/2016 | Bassett | G06F 21/577 726/23 |
| 2016/0212172 | A1* | 7/2016 | Senanayake | H04L 63/20 |
| 2016/0359695 | A1* | 12/2016 | Yadav | H04L 43/04 |
| 2016/0378978 | A1* | 12/2016 | Singla | G06F 21/55 726/23 |
| 2017/0048270 | A1* | 2/2017 | Boyadjiev | H04L 63/1425 |
| 2017/0083815 | A1* | 3/2017 | Sanchez Charles | G06N 5/022 |
| 2017/0286690 | A1* | 10/2017 | Chari | G06F 21/577 |
| 2018/0109544 | A1* | 4/2018 | Neil | H04L 63/1433 |
| 2018/0139227 | A1* | 5/2018 | Martin | H04L 63/1433 |
| 2019/0068618 | A1* | 2/2019 | Mestha | H04L 63/1416 |
| 2019/0102678 | A1* | 4/2019 | Chang | G06N 3/084 |

OTHER PUBLICATIONS

Philip K. Chan et al., A Machine Learning Approach to Anomaly Detection, Technical Report. Florida Institute of Technology, Mar. 29, 2003.

Aaron Clauset et al., Finding community structure in very large networks, Physical review E 70, Aug. 2004.

Anita K. Jones et al., Computer System Intrusion Detection: A Survey, Computer Science Technical Report, Feb. 2000, pp. 1-25.

Tomas Mikolov et al., Distributed Representations of Words and Phrases and their Compositionality, In Advances in Neural Information Processing Systems, In Advances in Neural Information Processing Systems, Oct. 2013.

Darren Mutz et al., Anomalous System Call Detection, ACM Transactions on Information and System Security (TISSEC), Feb. 2006, pp. 61-93.

M.E.J. Newman, Finding community structure in networks using the eigenvectors of matrices, Physical review E 70, May 2006.

Mark E.J. Newman, Modularity and community structure in networks. Proceedings of the national academy of sciences 103, Jun. 2006, pp. 8577-8582.

Pascal Pons et al., Computing communities in large networks using random walks, Computing communities in large networks using random walks. In International Symposium on Computer and Information Sciences. Springer, Dec. 2005, pp. 284-293.

Zhiqiang Xu et al., A Model-based Approach to Attributed Graph Clustering, SIGMOD'12, May 20-24, 2012, Scottsdale, Arizona.

Jaewon Yang et al., Community Detection in Networks with Node Attributes, I2013 IEEE 13th International Conference on Data Mining, Dallas, TX, Dec. 2013, pp. 1151-1156.

Yang Zhou et al., Graph Clustering Based on Structural/Attribute Similarities, VLDB '09, Aug. 24-28, 2009, Lyon, France.

\* cited by examiner

BEHAVIOR-BASED COMMUNITY DETECTION IN ENTERPRISE INFORMATION NETWORKS

RELATED APPLICATION INFORMATION

This application claims priority to U.S. Provisional Application Ser. No. 62/463,976, filed on Feb. 27, 2017, U.S. patent application Ser. No. 15/098,861, filed on Apr. 14, 2016 and to U.S. Provisional Application Ser. No. 62/148,232 filed on Apr. 16, 2015, incorporated herein by reference in their entirety.

BACKGROUND

Technical Field

The present invention relates to host-level system behavior analysis and, more particularly, to the analysis of system behavior in comparison to systems having similar behavioral profiles.

Description of the Related Art

Enterprise networks are key systems in corporations and they carry the vast majority of mission-critical information. As a result of their importance, these networks are often the targets of attack. The behavior of individual systems within enterprise networks is therefore frequently monitored and analyzed to detect anomalous behavior as a step toward detecting attacks.

SUMMARY

A method for detecting host community include modeling a target host's behavior based on historical events recorded at the target host. One or more original peer hosts having behavior similar to the target host's behavior are found by determining a distance in a latent space that embeds the historical events between events of the target host and events of the one or more original peer hosts. A security management action is performed based on behavior of the target host and the determined one or more original peer hosts.

A system for detecting host community includes a host behavior module configured to model a target host's behavior based on historical events recorded at the target host. A peer host module includes a processor configured to determine one or more original peer hosts having behavior similar to the target host's behavior by determining a distance in a latent space that embeds the historical events between events of the target host and events of the one or more original peer hosts. A security module is configured to perform a security management action based on behavior of the target host and the determined one or more original peer hosts.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide host-level anomaly detection for large systems. In a large security system, surveillance agents may be deployed on each host to automatically monitor the system's activity such as, e.g., active processes, file accesses, and socket connections. The present embodiments use this monitored information to identify the anomaly status of each monitored host system.

Toward that end, the present embodiments first determine a behavior profile for each host based on that host's previous recorded behavior. Other hosts having similar behavior profiles (referred to herein as "peer hosts") are then identified and monitored together going forward. An anomaly score for each host can then be determined based on how closely it tracks the behavior of its peer hosts, with greater divergence from the behavior of the peer hosts corresponding to a larger anomaly score. This reflects the understanding that hosts which have similar behavior histories can be expected to behave similarly in the future. The present embodiments can thereby determine the anomaly status of a given host in an unsupervised manner, with a large volume of data, and in a noisy, dynamic environment that defies typical statistical assumptions.

Figure 1:
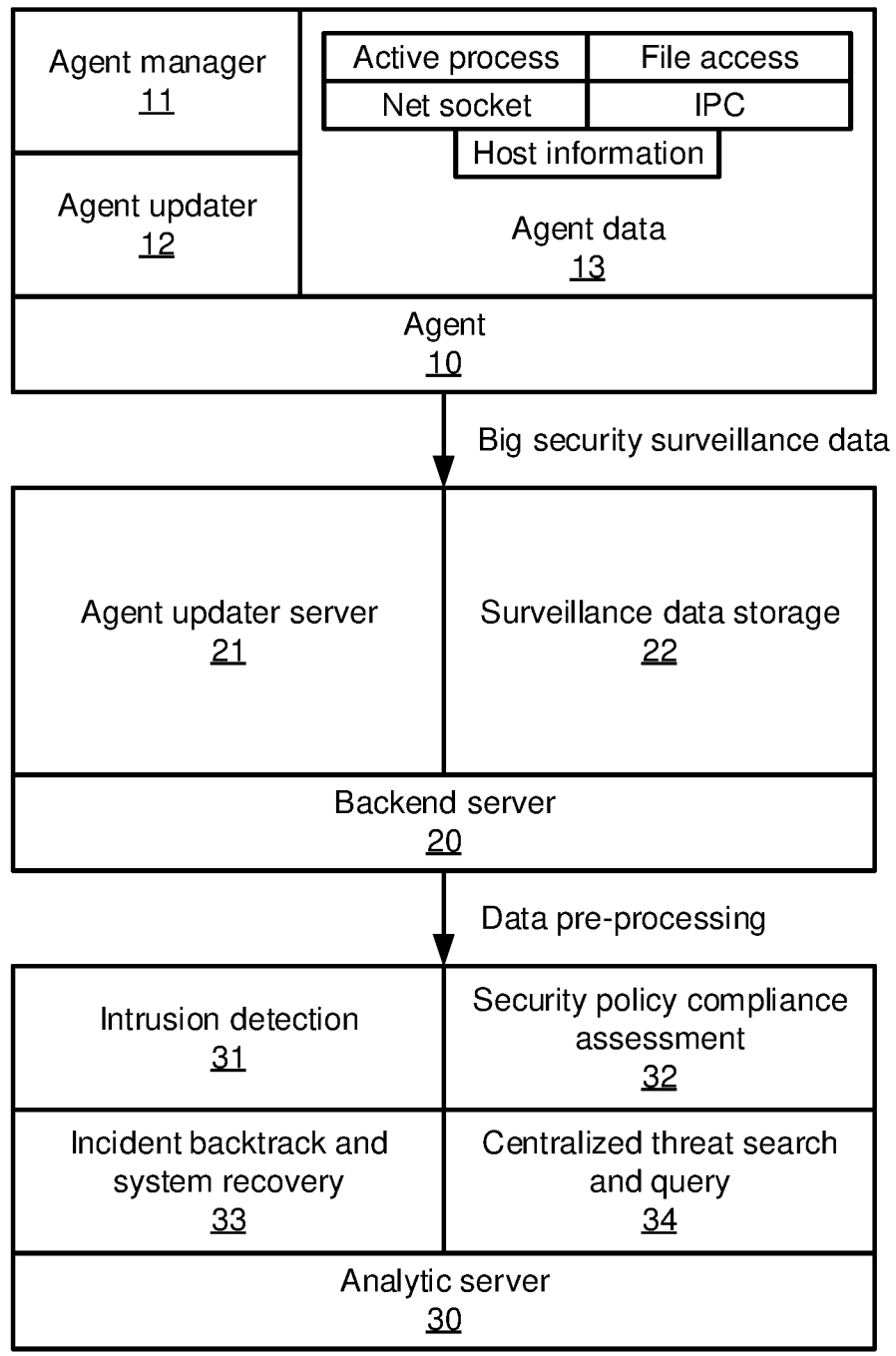
FIG. 1 is a block/flow diagram directed to an automatic security intelligence system architecture in accordance with the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
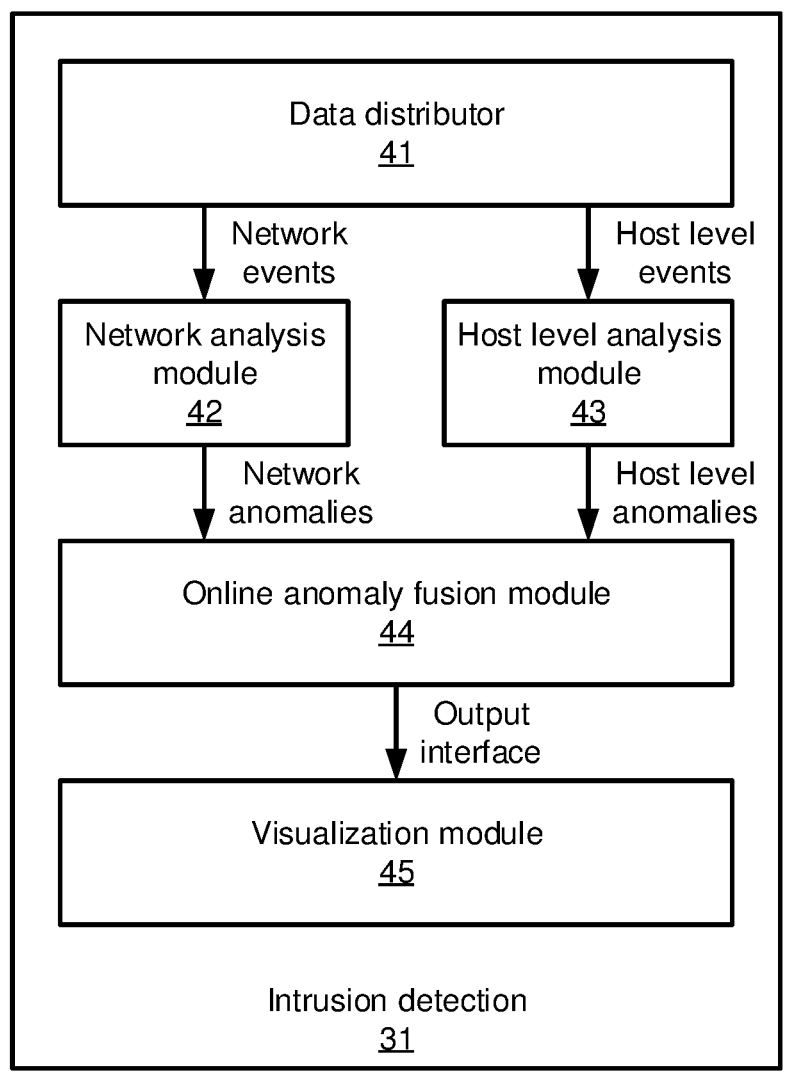
FIG. 2 is a block/flow diagram directed to an intrusion detection engine architecture in accordance with the present principles.

Referring now to FIG. 2, additional detail on intrusion detection 31 is shown. There are five modules in an intrusion detection engine: a data distributor 41 that receives the data from backend server 20 and distributes the corresponding to network level module 42 and host level module 43; network analysis module 42 that processes the network communications (including TCP and UDP) and detects abnormal communication events; host level analysis module 43 that processes host level events, including user-to-process events, process-to-file events, and user-to-registry events; anomaly fusion module 44 that integrates network level anomalies and host level anomalies and refines the results for trustworthy intrusion events; alert ranking and attack scenario reconstruction module 46 that uses both temporal and content correlations to rank alerts and reconstruct attack scenarios; and visualization module 45 that outputs the detection results to end users.

The detectors that feed the intrusion detection system 31 may report alerts with very different semantics. For example, network detectors monitor the topology of network connections and report an alert if a suspicious client suddenly connects to a stable server. Meanwhile, process-file detectors may generate an alert if an unseen process accesses a sensitive file. The intrusion detection system 31 integrates alerts regardless of their respective semantics to overcome the problem of heterogeneity.

Figure 3:
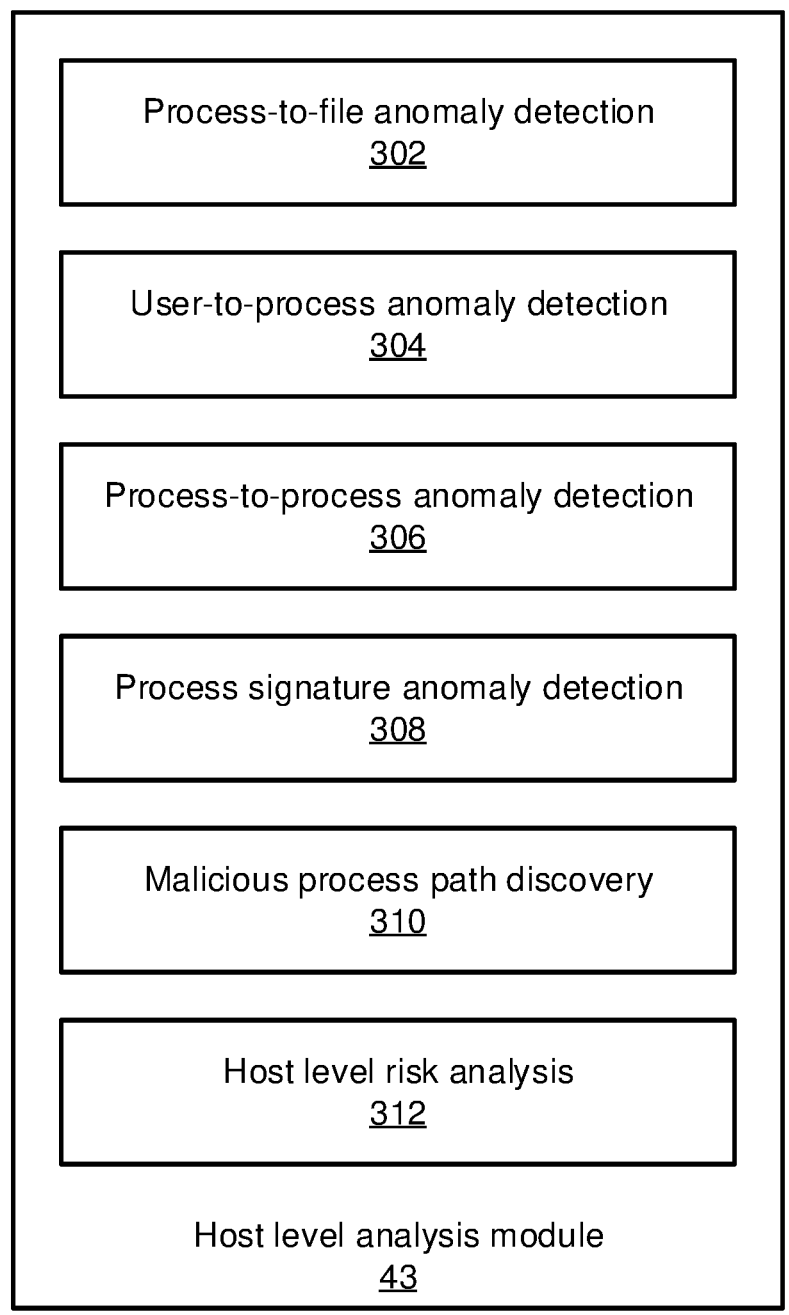
FIG. 3 is a block/flow diagram directed to a host level analysis module architecture in accordance with the present principles.

Referring now to FIG. 3, a method for host level analysis is shown. The present embodiments provide particular focus on the operation of host level analysis module 43. Process-to file anomaly detection 302 takes host level process-to-file events from the data distributor 41 as input and discovers the abnormal process-to-file events as an output. User-to-process anomaly detection 304 takes all streaming process events as input, models each user's behavior at the process level, and identifies the suspicious processes run by each user as output. Process-to-process anomaly detection 306 takes all streaming process events as input, models each process's execution behavior, and identifies the suspicious process execution event.

Process signature anomaly detection 308 takes process names and signatures as input and detects processes with suspicious signatures. Malicious process path discovery 310 takes current active processes as path starting points and tracks all the possible process paths by combing the incoming and previous events in a user-defined time window. The present embodiments focus specifically on a host level risk analysis that determines, on a per-host basis, an anomaly score for the host that characterizes how much the host has deviated from expected behavior.

Figure 4:
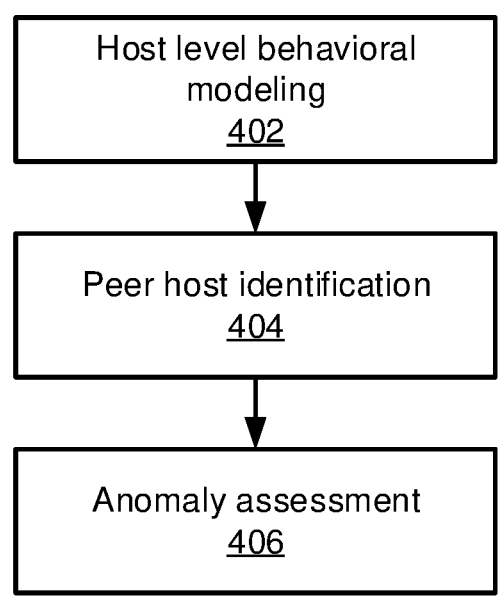
FIG. 4 is a block/flow diagram directed to a method for performing host level risk analysis in accordance with the present principles.

Referring now to FIG. 4, a method of performing host level risk analysis 312 is shown. Block 402 performs host level behavioral modeling. This modeling may be performed based solely on historical events recorded at the host. Block 404 then leverages the results of host level behavioral modeling to find a group of peer hosts that share similar behaviors with the host in question. It should be noted that a peer host is determined solely on the basis of host behavior rather than on host role or network connections. Block 406 then identifies anomalies in the behavior of the host based on the ongoing behaviors of the peer hosts. This may be performed over a period of time (e.g., a week).

The historical events used by host level behavior modeling 402 may include, for example, network events and process-level events. A network event e is defined herein as a 7-tuple, e=<src-ip, src-port, dst-ip, dst-port, connecting-process, protocol-num, timestamp>, where src-ip and src-port are the IP address and port of the source host, dst-ip and dst-port are the IP and port of the destination host, connecting-process is the process that initializes the connection, protocol-num indicates the protocol of the connection, and timestamp records the connection time. It should be noted that ASI agents are generally light-weight. To reduce resource consumption and to maintain privacy, the agent generally does not collect the content and traffic size of network connections, making that information unavailable for analysis.

Table 1 shows an exemplary list of network events from 11:30 am to 12:05 am in on Feb. 29, 2016. These network events can be classified to two categories based on the dst-ip: if the dst-ip is in the range of enterprise network's IP addresses (2.15.xx.xx), the network event is an inside connection between two hosts of the enterprise network. If the dst-ip is not in the range, it is an outside connection between an internal host and an external host. In Table 1, $e_1$, $e_3$, $e_5$ and $e_6$ are inside connections and $e_2$ and $e_4$ are outside connections.

TABLE 1

| Ev | Src-ip | Src-port | Dst-ip | Dst-port | Process | Prot. | Time |
|---|---|---|---|---|---|---|---|
| $e_1$ | 138.15.165.26 | 19820 | 2.15.16.22 | 445 | ntoskrnl.exe | 17 UDP | 2016-2-29 11:30:12 |
| $e_2$ | 138.15.165.32 | 1672 | 4.12.22.17 | 80 | chrome.exe | 6 TCP | 2016-2-29 11:35:09 |
| $e_3$ | 138.15.165.40 | 1823 | 2.15.16.23 | 445 | ntoskrnl.exe | 17 UDP | 2016-2-29 11:40:56 |
| $e_4$ | 138.15.165.27 | 621 | 3.12.22.17 | 80 | chrome.exe | 6 TCP | 2016-2-29 11:52:19 |
| $e_5$ | 138.15.165.28 | 8203 | 2.15.16.22 | 445 | ntoskrnl.exe | 17 UDP | 2016-2-29 12:02:09 |
| $e_6$ | 138.15.165.41 | 7625 | 2.15.16.23 | 445 | ntoskrnl.exe | 17 UDP | 2016-2-29 12:04:23 |

A process-level event e is a 5-tuple, e=<host-id, user-id, process, object, timestamp>, where host-id indicates the host where the agent is installed, user-id identifies the user who runs the process, timestamp records the event time, process is the subject of the event and object is the object of the event. The object can be a file, another process or a socket that contains the connection information. According to an object's type, process-level events can be classified into one of three categories: process-file events, process-socket events, and process-process events.

Table 2 shows an exemplary list of process-level events from 11:30 AM to 12:05 AM on Feb. 29, 2016. The IP address is used as an identifier for the hosts, $e_1$ and $e_5$ are process-file events, $e_3$ and $e_4$ are process-socket events, and $e_2$ is a process-process event.

| Ev | host-id (ip) | user-id | Process | object | Time |
|---|---|---|---|---|---|
| $e_1$ | 2.15.16.52 | system | ntoskrnl.exe | File at C:\Windows\System32\drivers\afd.sys | 2016-2-29 11:30:12 |
| $e_2$ | 2.15.16.33 | root | explorer.exe | Process as C:\Windows\System32\spoolsv.exe | 2016-2-29 11:35:09 |
| $e_3$ | 2.15.16.22 | user-1 | firefox.exe | Socket as 138.15.165.235:8080 | 2016-2-29 11:40:56 |
| $e_4$ | 2.15.16.22 | user-1 | chrome.exe | Socket as 101.125.228.17:80 | 2016-2-29 11:52:19 |
| $e_5$ | 2.15.16.38 | root | spoolsv.exe | File at C:\Documents\readme.docx | 2016-2-29 12:02:09 |

The network events can be seen as external events and the process-level events can be treated as internal events. In general, internal events capture a single host's local behaviors and external events capture the interaction behaviors between multiple hosts. In particular, given a host h ∈ H, a set of n events $E_h = \{e_0, e_1, \ldots, e_{n-1}\}$ is monitored from h, including both network events and process-level events. The network event data can be expressed as a collection of triples $\{<h, e_0, h_0'>, <h, e_1, h_1'>, \ldots, <h, e_i, h_j'>\}$. Process-level event information can be expressed as a set of pairs $\{<h, e_0'>, <h, e_1'>, \ldots, <h, e_j'>\}$.

A host is then modeled as the context of all its process-level events and as the context of all hosts reached by its network events. All pairs of hosts and events are embedded into a common latent space where their co-occurrences are preserved. This is performed using text embedding methods that capture syntactic and semantic word relationships, for example by unsupervised learning of word embeddings by exploiting word co-occurrences.

In particular, a process-level event e on the host h can be modeled as P(h|e)—the conditional probability of a host h given an event e, i.e., the probability that the event e is observed from the host h, via the following softmax function:

$$P(h|e) = \frac{\exp(v_h \cdot v_e)}{\sum_{h' \in H} \exp(v_{h'} \cdot v_e)}$$

where $v_h$ and $v_e$ are the embedding vectors for the host h and the event e, respectively, and H is the set of all hosts. Similarly, a network event can be modeled as P(h'|h, e)—the conditional probability of a host h' given a host h and an event e, i.e., the probability that the host h issues a network event e that connects to the host h'. The network event conditional probability can be computed by:

$$P(h'|h, e) = P(h'|h) = \frac{\exp(v_{h'} \cdot v_h)}{\sum_{h_i \in H} \exp(v_{h_i} \cdot v_h)}$$

where $v_h$ and $v_{h'}$ are the embedding vectors for the hosts h and h', respectively, and H is the set of all hosts.

Given a collection of n events $\{e_0, e_1, \ldots, e_{n-1}\}$ monitored from all hosts in H, the embedding vectors for both hosts and events are set so that the above-mentioned two probability functions are maximized. This optimization model can be expensive to solve due to the denominators of both equation summing over all hosts of H. Thus, a negative sampling is applied. In general, to avoid dealing with too many hosts to be iterated, only a sample of them are updated. All observed co-occurred host-event pairs from the input data are kept and a few "noisy pairs" are artificially sampled. The noisy pairs are not supposed to co-occur, so the conditional probabilities should be low. Hence, negative sampling offers an approximate update that is computationally efficient, since the calculation now only scales with the size of noise. This provides the following objective functions to be minimized:

$$O_1 = -\Sigma_{(h,e) \in D_P} \log \sigma(v_h \cdot v_e) - \Sigma_{(h',e') \in D_P'} \log \sigma(v_{h'} \cdot v_{e'})$$

$$O_2 = -\Sigma_{(h,\dot{e},\ddot{h}) \in D_N} \log \sigma(v_h \cdot v_{\ddot{h}}) - \Sigma_{(h,\dot{e},\ddot{h}) \in D_N'} \log \sigma(v_{\ddot{h}} \cdot v_{\ddot{h}})$$

where σ is the sigmoid function, $D_P$ is the collection of pairs of pairs of process-level events, $D_N$ is the set of triples of network-level events, (ḣ, ė, ḧ) is a negative sample for network-level events, and ḣ and ḧ are two hosts in the negative network-level sample. $D_P'$ and $D_N'$ are the two sets of negative samples constructed by certain sampling scheme for process-level events and network-level events, respectively. Concretely, for each co-occurrence (h, e) ∈ $D_p$, k noises $(h_1, e), (h_2, e), \ldots, (h_k, e)$ are sampled, where $\{h_1, h_2, \ldots h_k\}$ is drawn according to a noise distribution. Lacking guidance regarding the negative sampling, several are empirically tested and the best one is found when the sampling is in a probability inversely proportional to the frequency of co-occurrence with e. Then, the mini-batch gradient descent may be used to solve the objective function.

To find a group of peer hosts that share similar behaviors with a target host, block 404 creates clusters of hosts, taking advantage of the fact that the learned embeddings for the hosts are their latent behavior representations in that space. The following pseudo-code shows details of finding a group of peer hosts:

Input: The set of learned embeddings vectors for every host: $V = \{v_h : \forall h \in H\}$; The predefined number of peer groups k; The limit of iterations MaxIters;
Output: The set of peer group labels of all hosts: L={l(h):∀$v_h$ ∈ V};
Initialize the set of peer group centroids C={$c_1, c_2, \ldots c_k$} by randomly selecting k elements from V;
For each $v_h$ in V
$l(v_h) \leftarrow \text{argmin}_{j \in \{1, \ldots, k\}} \|v_h - c_j\|^2$;
changed←false;
iter←0;
While changed=false and iter≤MaxIters
For each $c_j$ ∈ C {

$$c_j \leftarrow \frac{\sum_{v_h \in V} \mathbb{1}\{l(v_h) = j\} v_h}{\sum_{v_h \in V} \mathbb{1}\{l(v_h) = j\}}$$

For each $v_h$ in V {

```
      minDist ← argmin_{j∈{1,...,k}} ‖ v_h - c_j ‖²;
      If minDist ≠ l(v_h) {
            l(v_h) ← minDist;
            changed ← false;
      }
}
iter ← iter + 1
}
```

Return $\{l(h): \forall v_h \in V\}$;

Since all hosts are modeled in the same space, classic unsupervised clustering can be followed to obtain peer groups. First, given a predefined integer k as the number of peer groups to be found, k hosts are selected at random as peer group centers (centroids). Then every host is assigned to its closest group centroid according to a Euclidean distance function. The centroid of all hosts in each cluster is recalculated and the values of the centroids are updated, taken as the geometric mean of the points that have that centroid's label. This process repeats until the hosts can no longer change groups. The output is a set of peer group labels corresponding to each host.

Expressed another way, an expectation-maximization model can be used in block 404. An objective function can be formulated as:

$$O_c = \sum_{j=0}^{K-1} \sum_{h \in H} \|v_h - c_j\|^2$$

where $c_j$ is the community centroid for community j, $v_h$ is the embedding vector for the host h, and K is the number of communities. By minimizing this objective function, the best community structure of hosts can be determined.

A unified model can then be obtained by adding together the objective functions as $O_u = O_1 + O_2 + O_c$. By minimizing this equation, the community centroids $C = \{c_1, c_2, \ldots, c_K\}$ can be determined. There are two sets of parameters in the unified model: the embedding vectors of hosts and events ($V_H$ and $V_E$) and the community centroids C. Thus a two-step iterative learning method may be used, where the embedded vectors and the community centroids mutually enhance one another. In the first step, the community centroids C and community assignment $l(V_H)$ are fixed and the best embedding vectors $V_H$ and $V_E$ are learned. In the second step, the predicted embedded vectors $V_H$ and $V_E$ are learned and the best values for C and $l(V_H)$ are learned.

Thus for the first step, when the community centroids C are fixed, the $O_c$ term becomes a generalization term that makes the embedded vectors closer to their corresponding community centroid. The optimization of the reduced objective function for the first step is as follows: given two sets of data samples, $D_P$ and $D_N$, in each iteration, two mini-batches of process-level events and network-level events are sampled as $D_{b_P}$ and $D_{b_N}$. Then a set of negative samples $D'_{b_P}$ and $D'_{b_N}$ are generated according to a noise distribution and two parameters that control the size of the negative samples, $k_P$ and $k_N$.

Without a rule of thumb for choosing an optimal noise distribution, several may be tested empirically to select the best one when sampling. One particular noise distribution that has been found to be effective is a distribution where the sampling is calibrated in the probability inversely proportional to the frequency of co-occurrence. Experiments have also shown that a suitable value for $k_P$ and $k_N$ is 5. A gradient descent can then be used over $V_H$ and $V_E$ to get the best embedded vectors.

During the second step, when $V_H$ and $V_E$ are fixed, the problem is reduced to expectation-maximization to provide the best community centroids C and community assignment $l(V_H)$. First the community assignment $l(v_h)$ is calculated for each host h as follows:

$$l(v_h) = \underset{c_i}{\operatorname{argmin}} \|v_h - c_i\|^2$$

The centroid $c_i$ is then recalculated for all hosts in each group. The values of the centroids are updated, taken as the geometric mean of the points that have the same label as the centroid. The first and second steps are repeated iteratively until all the hosts can no longer change groups.

Block 406 then uses the detected host peer groups to assess the host's anomaly level. The peer groups reflect behavioral similarity between all hosts, based on a potentially very large corpus of historical data. Reviewing the host status over a particular time period, that host should still behave similarly to its peer hosts. If not, block 406 determines that the host has a suspicious anomaly status.

One question is how to identify the severity level of a host's anomaly status. This can be addressed from two perspectives. From a host perspective, it is straightforward determination that a host's peers change relative to its past peer hosts. Thus, the following function measures the anomaly level of a host:

$$f_1(h) = 1 - \frac{|PE(h) \cap PE'(h)|}{|PE(h) \cup PE'(h)|}$$

where PE(h) is the set of peers found in the past and PE'(h) is the set of peers identified later on. From an event perspective, using the embedding vectors across all events collected from all hosts, it can be determined how different the events are between peer hosts:

$$f_2(h) = 1 - \left(\frac{1}{|PE(h)||E_h|}\right) \sum_{e \in E_h} \sum_{h' \in PE(h)} \max_{e' \in E_{h'}} \cos(e, e')$$

where $E_h$ is the set of events monitored from host h and cos(e,e') is the cosine similarity between the embedding vectors of event e and event e'. In particular, for each event on a host h, the distance between the event and its closest event on each peer host of h is computed, in terms of cosine similarity. The average over all peer hosts is determined and the average of all events from one host is returned as the score for this host. The two functions may be combined together as $f(h) = \alpha f_1(h) + \beta f_2(h)$ to return the anomaly score of the host h, where $\alpha$ and $\beta$ are weighting factors that indicate the contribution of host perspective and event perspective, respectively.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
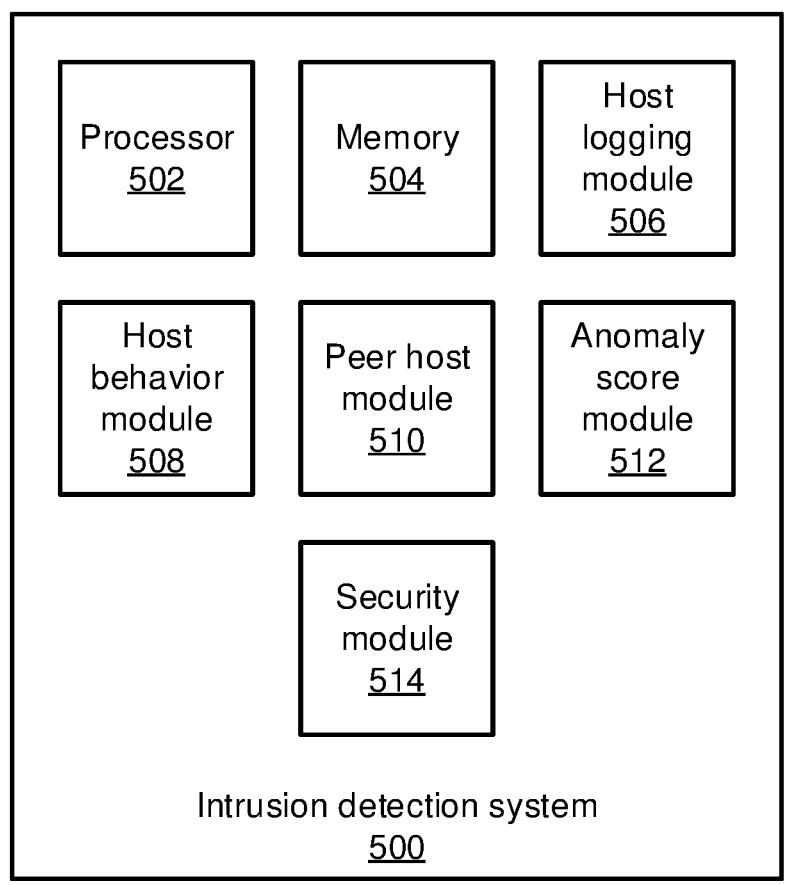
FIG. 5 is a block diagram directed to an intrusion detection system architecture in accordance with the present principles.

Referring now to FIG. 5, a host level risk analysis system 500 is shown. The system 500 includes a hardware processor 502 and memory 504. In addition, a number of functional modules are included that may, in some embodiments, be implemented as software that is stored in memory 504 and that is executed by hardware processor 502. In other embodiments, the functional modules may be implemented as one or more discrete hardware components in the form of, e.g., application specific integrated chips or field programmable gate arrays. Still other embodiments may use both hardware and software forms for different functional modules, or may split the functions of a single functional module across both hardware and software components.

Host logging module 506 collects information from agents at various hosts and stores the information in memory 504. This can include historical event information, including process-level events and network events, as well as real-time event information. Host behavior module 508 determines a host behavior profile for each host based on historical event information. Peer host module 510 then determines each host's peers based on a behavioral similarity. In particular, peer host module 510 maps each host's behavior profile into an embedding space and clusters hosts according to proximity in that space. Anomaly score module 512 then monitors incoming events over a period of time to reevaluate the host's behavior relative to that of its peers. If a host's behavior deviates significantly from the behavior of its peer hosts, anomaly score module 512 assigns a high value to the host's anomaly score. If the host's behavior conforms to the behavior of its peer hosts, anomaly score module 512 assigns a low value to the host's anomaly score.

Based on the outcome of the anomaly score module 512, a security module 514 performs manual or automated security actions in response to the ranked alerts and alert patterns. In particular, the security module 514 may have rules and policies that trigger when an anomaly score for a host exceeds a threshold. Upon such triggers, the security module 514 may automatically trigger security management actions such as, e.g., shutting down devices, stopping or restricting certain types of network communication, raising alerts to system administrators, changing a security policy level, and so forth. The security module 514 may also accept instructions from a human operator to manually trigger certain security actions in view of analysis of the anomalous host.

Figure 6:
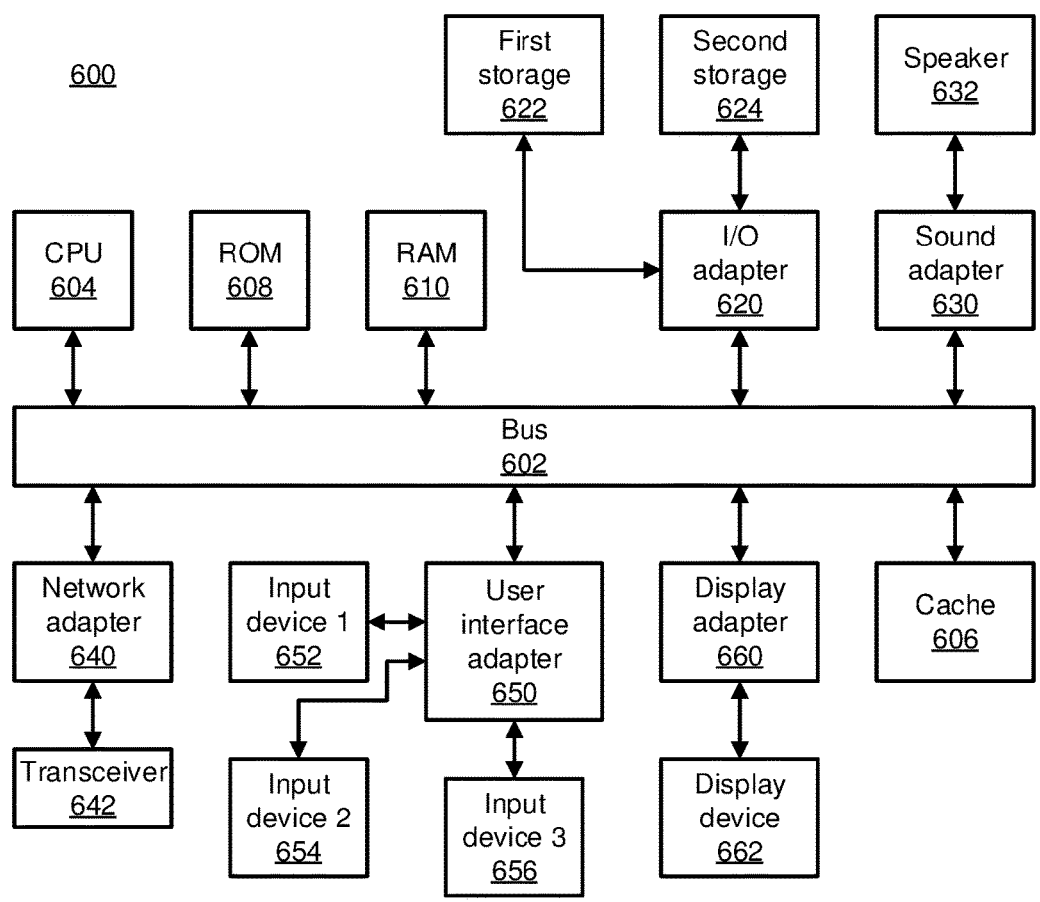
FIG. 6 is a block diagram directed to a processing system in accordance with the present system.

Referring now to FIG. 6, an exemplary processing system 600 is shown which may represent the intrusion detection system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting host community, comprising:
embedding historical events, recorded at a target host, in a latent space using a negative sampling that approximates a maximized conditional probability that an event will occur at a target host;
modeling the target host's behavior based on the embedded historical events, wherein the target host is modeled as a context of process-level events and as a context of all hosts reached by network events of the target host and wherein each process-level event on the target host is modeled as a conditional probability of the target host given the event;
determining one or more original peer hosts having behavior similar to the target host's behavior by determining a distance in a latent space that embeds the historical events between events of the target host and events of the one or more original peer hosts; and
performing a security management action based on behavior of the target host and the determined one or more original peer hosts.

2. The method of claim 1, wherein determining one or more peer hosts comprises clustering hosts based on distance in the latent space.

3. The method of claim 2, wherein clustering comprises identifying a set of initial cluster centroids and iteratively updating the centroids after assigning hosts to a closest cluster.

4. The method of claim 1, wherein performing the security management action comprises determining an anomaly score based on a comparison between behavior of one or more new peer hosts and behavior of the one or more original peer hosts.

5. The method of claim 1, wherein performing the security management action comprises determining an anomaly score based on a similarity between new events recorded at the target host and new events recorded at the one or more original peer hosts.

6. The method of claim 1, wherein performing the security action further comprises automatically performing at least one security action selected from the group consisting of shutting down devices, stopping or restricting certain types of network communication, raising alerts to system administrators, and changing a security policy level.

7. The method of claim 1, wherein each network event is modeled as a conditional probability that one host issues a network event that connects to another host.

8. A system for detecting host community, comprising:
a host behavior module configured to embed historical events, recorded at a target host, in a latent space using a negative sampling that approximates a maximized conditional probability that an event will occur at the target host, and to model the target host's behavior based on the embedded historical events, to model the target host as a context of process-level events and as a context of all hosts reached by network events of the target host, and to model each process-level event on the target host as a conditional probability of the target host given the event;
a peer host module comprising a processor configured to determine one or more original peer hosts having behavior similar to the target host's behavior by determining a distance in a latent space that embeds the historical events between events of the target host and events of the one or more original peer hosts; and
a security module configured to perform a security management action based on behavior of the target host and the determined one or more original peer hosts.

9. The system of claim 8, wherein the peer host module is further configured to cluster hosts based on distance in the latent space.

10. The system of claim 9, wherein the peer host module is further configured to identify a set of initial cluster centroids and iteratively update the centroids after assigning hosts to a closest cluster.

11. The system of claim 8, further comprising an anomaly score module configured to determine an anomaly score for use by the security module based on a comparison between behavior of one or more new peer hosts and behavior of the one or more original peer hosts.

12. The system of claim 8, further comprising an anomaly score module configured to determine an anomaly score for use by the security module based on a similarity between new events recorded at the target host and new events recorded at the one or more original peer hosts.

13. The system of claim 8, wherein the security module is further configured to automatically perform at least one security action selected from the group consisting of shutting down devices, stopping or restricting certain types of network communication, raising alerts to system administrators, and changing a security policy level.

14. The system of claim 8, wherein the host behavior module is further configured to model each network event as a conditional probability that one host issues a network event that connects to another host.

* * * * *